Dec. 28, 1965   R. V. GOULD   3,226,721
SCANNING ANTENNA UTILIZING FOUR ROTARY PRISMS TO
PRODUCE RECTILINEAR SCAN AND FIFTH ROTARY
PRISM TO PRODUCE CONICAL SCAN
Filed March 26, 1948   2 Sheets-Sheet 1
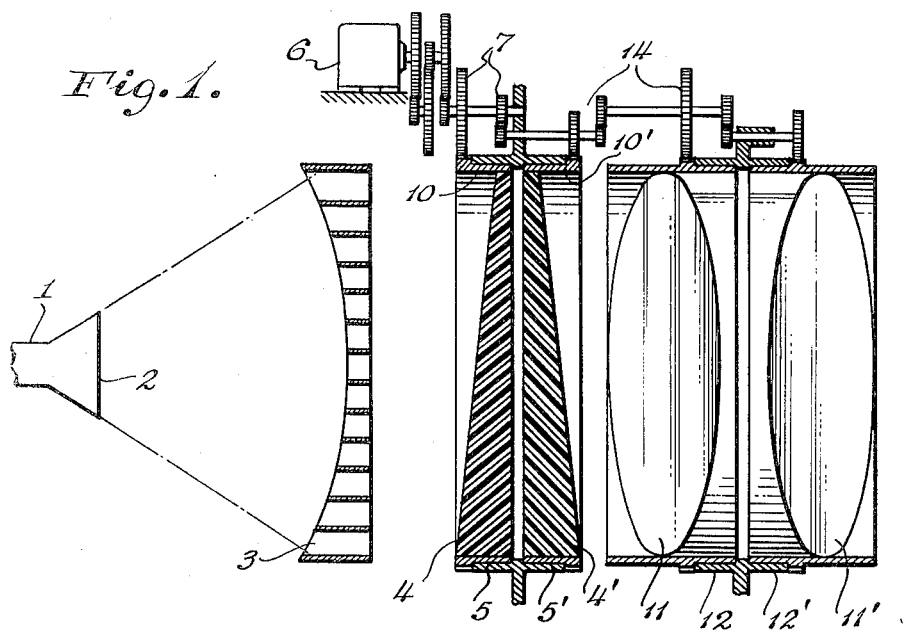
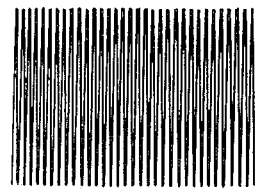
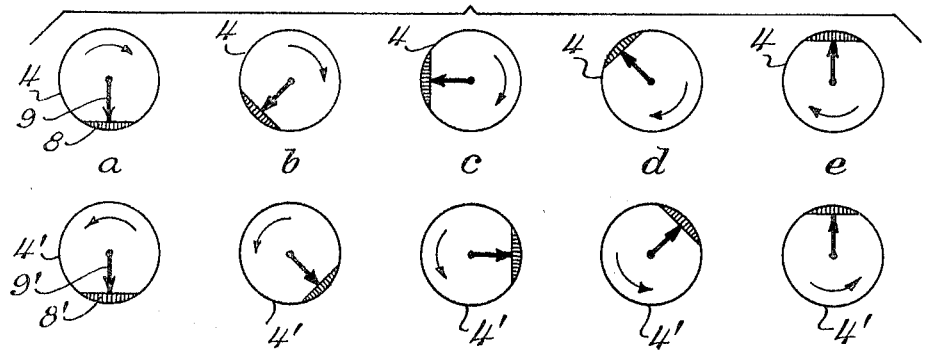
INVENTOR
ROBERT V. GOULD
BY
Paul B. Hunter
ATTORNEY Dec. 28, 1965   R. V. GOULD   3,226,721
SCANNING ANTENNA UTILIZING FOUR ROTARY PRISMS TO
PRODUCE RECTILINEAR SCAN AND FIFTH ROTARY
PRISM TO PRODUCE CONICAL SCAN
Filed March 26, 1948   2 Sheets-Sheet 2

INVENTOR
ROBERT V. GOULD
BY
ATTORNEY

United States Patent Office 3,226,721
Patented Dec. 28, 1965

3,226,721
SCANNING ANTENNA UTILIZING FOUR ROTARY PRISMS TO PRODUCE RECTILINEAR SCAN AND FIFTH ROTARY PRISM TO PRODUCE CONICAL SCAN
Robert V. Gould, Hempstead, N.Y., assignor to Sperry Rand Corporation, a corporation of Delaware
Filed Mar. 26, 1948, Ser. No. 17,192
7 Claims. (Cl. 343—754)

This invention relates generally to scanning antenna systems and the invention has reference more particularly to a novel scanning system suitable for scanning desired scanning patterns, such as a raster scan or a conical scan, or a combination of these scans such as limited raster search scan in combination with a conical tracking scan.

Directive antenna scanner systems have been developed heretofore in various types of radar equipment for the purpose of locating and determining the position of targets or objects, and the distances thereto. Generally, such directive antenna systems are provided with motor-driven units acting to either actuate a parabolic or other reflector at a regular angular rate of speed to effect scanning, or the electromagnetic feed supplying the scanner is actuated mechanically. These prior systems are open to the objection that where the reflector itself is actuated, large inertia effects are set up due to the reversal of direction of the reflector at each end of its motion, which inertia effects are detrimental to the mounting in the airplane or other support upon which the reflector is mounted. Furthermore, the speed of scan in such prior art devices is strictly limited by such inertia effects. The considerable variation in the loading imposed upon the spin driving motor as the paraboloid reflector is nodded relative to the spin axis of the antenna system is also a limiting feature of such prior art antennas, large and variable unbalance forces being thus produced.

The oscillating motion of the reflector or antenna results in large acceleration or deceleration forces causing undesired vibration, and the same is true to a lesser extent where the antenna feed is actuated. Also, a further complication arises in that a mechanical rotating joint or joints is usually necessary in the coaxial line or other feed line, and this ofttimes results in a variable standing wave in the line due to changes in the angular relations of the various line sections and a consequent undesirable noise modulation and a tendency toward deterioration of the radiation pattern.

Different types of radar systems serve different fundamental purposes. For example, certain systems are used for enabling one aircraft to pick up and intercept another aircraft as for the purpose of directing gun fire toward the intercepted craft. Another example is a radar system which enables one craft, such as an airplane, to search for a vessel upon the ocean surface to direct explosive charges toward the vessel. Still another radar system may be used on a mobile land vehicle for picking up and tracking airplane targets.

The apparatus of the present invention is particularly valuable where a rapid scanning operation is desired for effecting a limited raster search scanning operation and for conical tracking purposes, as where a mobile land vehicle is attemping to pick up and track aircraft targets. This invention utilizes pairs of wedges or wedge lenses, the lenses of each pair rotating in opposite directions and at the same speed, while the speeds of the pairs differ to provide a suitable raster scan. The apparatus may also embody the use of a wedge or wedge lens for effecting conical scanning or tracking after the pairs of wedge lenses have located an object or a target.

Therefore, an object of the present invention is to provide a novel scanning antenna system employing one or more pairs of movable prisms or wedge lenses, and disposed in the path of electromagnetic energy passing out of and into an antenna or feed for the purpose of causing refraction of the electromagnetic energy and disposed so as to effect a desired scanning operation.

Another object of the present invention is to provide a novel scanning antenna system suitable for effecting limited search scan and for conical tracking scan thereafter.

Another object of the present invention is to provide a novel scanning antenna system wherein inertia effects due to oscillating systems are eliminated together with variable standing wave ratios in feed lines. The present invention employs elements which are continuously rotated during search scanning operations. No large accelerations or decelerations about the spin axis of the rotating elements are involved, minimizing unbalance problems. There is no requirement that spinning elements of the system be moved (while rotating) relative to the primary spin axis of the antenna system, so that none of the severe windage, loading, and unbalance problems which characterize prior art spiral scanning antennas in which the reflector is nodded about a nod axis while spinning about a spin axis at right angles thereto occur.

A further object of the present invention is to provide a novel scanning antenna system employing a pair of oppositely rotating prisms or wedge lenses, or other means for effecting lineal scanning in one plane together with a second pair of wedges or wedge lenses for effecting lineal scanning in a plane at right angles thereto; the combination of the two scanning means effecting a limited raster scan for locating objects.

Another object of the present invention is a system of the above character wherein conical tracking scan is accomplished by use of a suitable wedge or wedge lens adapted to be used in conjunction with the limited search scan.

Other objects and advantages will become apparent when taken in connection with the drawings wherein FIG. 1 is an elevational, partly sectional view of one form of the novel system of the present invention;

FIG. 1A illustrates raster scanning produced by the apparatus of FIG. 1;

FIG. 2 is a diagrammatic showing illustrating the method of operation of the system of FIG. 1;

Figure 3:
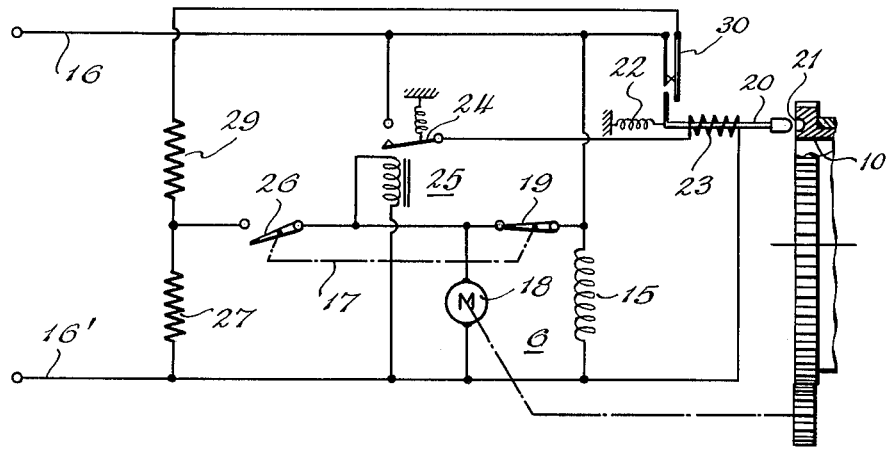
FIG. 3 is a wiring diagram of one form of the stopping and positioning or indexing means employed.

Referring now to FIGS. 1, 1A and 2 of the drawings, the reference numeral 1 designates a suitable source of electromagnetic radiation or reception shown as a wave guide antenna having a mouth 2 for directing electromagnetic radiation towards a lens 3 which is shown as of the metal-plate type. It is understood that a dielectric lens could be used if desired; the metal lens being preferred, however, in this location owing to its lightness and easily maintained tolerances. The lens 3 has a focussing action and produces a substantially parallel beam of electromagnetic radiation which is passed on to a pair of prisms or dielectric wedges lenses 4, 4' having a circular metal frames 10, 10', which lenses are similar and are shown rotatably supported in bearings 5, 5' for rotation therein.

The complementary wedges or wedge lenses 4, 4' are adapted to be driven in opposite directions by a motor 6 acting through reduction gearing 7. The action of these wedges is best shown in connection with FIG. 2, wherein is diagrammatically illustrated the action of these wedge lenses. Thus, at *a* in FIG. 2, the thick portion of the complementary lenses 4, 4' is illustrated by a hatched section 8, 8' so that each of these wedge lenses act to bend the radiation downwardly as shown by the vectors or arrows 9, 9'. Thus, with lenses 4, 4' in their positions shown in FIG. 1, the parallel beam of electromagnetic radiation leaving lens 3 is deflected downwardly by both of these lenses, thereby starting a vertical scan of the directive radiation pattern through a limited angle, the angle depending entirely upon the characteristics of the wedges or prisms 4, 4', i.e., the apex angle, and index of refraction of the material used. Thus, if the wedge lenses 4, 4' are of dielectric material such as polystyrene having an index of refraction of 1.6, the beam shift for a given apex angle will be greater than if the two complementary wedge lenses or prisms 4, 4' are made in the form of metal prisms or metal wedge lens whose index of refraction would be of the order of .62. Care must be taken in the use of metal lenses to render the same insensitive to polarization. This can be done by having the metal lens in the form of square wave guide cross sections, wherein any polarization impinging on the prism can be resolved into two components which are transmitted through it in exactly the same manner.

On the other hand, the polystyrene prisms or wedges weigh more than the metal lens and hence are not as desirable where weight is of importance as in aircraft. However, the weights of dielectric lenses can be correspondingly reduced through the use of stepped-lenses, which are well known in the art, and, as a matter of fact, metal lenses can also be stepped, and often are, thereby reducing the weight of these lenses also. The expedient of stepping the surface of the metal or dielectric lens is the process of reducing the lens profile in steps each time the lens exceeds a thickness which is equivalent to a phase advance or retard of one wavelength as explained by W. E. Koch in I.R.E. of November, 1946, page 829. The weight of the dielectric lens can also be further reduced by utilizing a coating material of high dielectric constant, such as titanium dioxide.

In *b* of FIG. 2, prism 4 has turned ⅛ of a revolution clockwise, whereas prism 4' has turned ⅛ of a revolution counterclockwise, so that the directive vectors are as shown by the arrows. The result from these two vectors are, however, still forward and downward, but not at as steep an angle as shown in *a*. In *c* of FIG. 2, the directivity of lens 4 is toward the left, whereas that of 4' is to the right so the resultant directivity is directly ahead. In other words, the two wedge lenses or prisms nullify each other in this position, and the beam is directed directly ahead; the beam having swept from its extreme downward position in *a* to its direct-ahead position in *c*. In *d*, ⅛ of a revolution later, both vectors are directed upward at an angle so that the beam has now moved upwardly and in *e* they have reached the upper limit of their scan. In other words, the beam has now reached its uppermost angle of deflection, thereby completing lineal scanning in elevation.

To obtain scanning in azimuth, a second pair of wedge lenses 11, 11' are employed which are shown as having larger apex angles than the complementary wedge prisms or wedge lenses 4, 4', thereby obtaining a wider lineal scan in azimuth. Prisms or lenses 11, 11' turn at a considerably slower rate than prisms 4, 4' to produce the raster type scan shown in FIG. 1A. For example, lenses 4, 4' may turn at a rate thirty times as fast as prisms 11, 11'. These latter prisms are mounted in bearings 12, 12' and are shown driven at the same speed, but in opposite directions from motor 6 acting through additional gearing 14. The operation of lenses 11, 11' is similar to that of 4, 4', only the former serve to effect lineal scanning in one plane such as azimuth, while the latter serve to effect lineal scanning at a faster rate in a plane at right angles to the first plane, i.e., elevation, thereby obtaining the scan of FIG. 1A.

Figure 4:
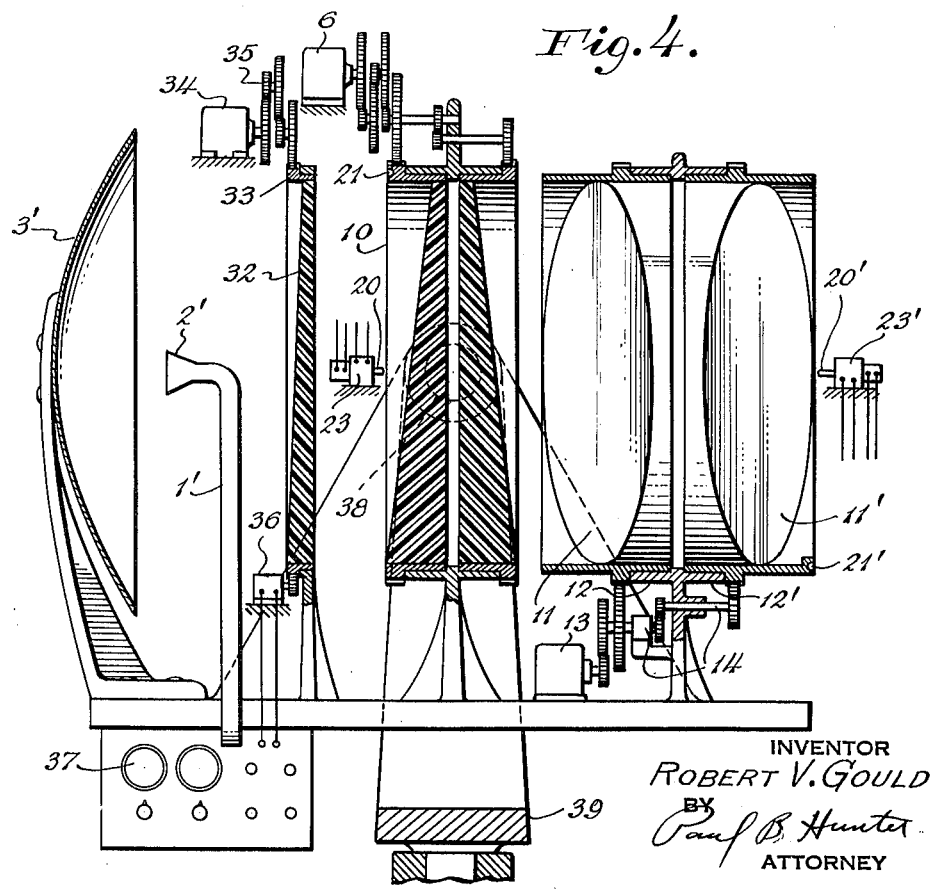
FIG. 4 illustrates the invention employed for effecting conical tracking as well as search scan.

While the apparatus of FIG. 1 will produce a raster scan shown in FIG. 1A, and provides means for locating a target or object within a desired field of view, it does not provide for tracking the target or object when the same is located. An apparatus suitable for this is shown in FIG. 4, wherein parts similar to FIG. 1 are correspondingly numbered, and wherein an additional relatively thin wedge or prism 32 is employed for effecting conical tracking of the target or object. This relatively narrow wedge provides a small angle conical tracking scan having a relatively high speed frequency of say, 60 cycles per second, and which, in order to accomplish its scanning, is shown carried by a circular frame 33, driven from a motor 34 through gear 35. This narrow prism 32 causes a slight deviation of the beam during search, as when using lenses 4, 4', 11, 11', but the actual stationary position of this lens is not serious during operation of the raster scan, since the deviation caused by it is small compared to the total search area. It will be understood that when tracking prism 32 is operating, the pairs of prisms 4, 4' are positioned oppositely to each other so as to nullify their refractive effects, and the same is true of the prisms 11, 11', and hence, in tracking, the system acts as though wedges 4, 4', 11, 11' were not present, so that the narrow wedge 32 gives an accurate desired conical scan.

In effecting conical tracking scan, it is necessary, as above mentioned, to properly position the pairs of wedges 4, 4' and 11, 11' in respect to each other, and suitable indexing or positioning means is shown in FIGS. 3 and 4 for accomplishing this purpose. In these figures, motor 6 for driving wedges or prisms 4, 4' has its field 15 connected across D.C. supply leads 16, 16'. A switch 17 having a blade 19, when closed as shown, also connects the armature 18 of motor 6 across the supply leads 16, 16'. An indexing plunger 20 is shown for cooperating with a recess or notch 21 in the periphery of the frame 10 of the lens 4.

The plunger is normally held out of engagement with notch 21, by means of a spring 22. A coil 23 surrounds the plunger 20 and is adapted to be connected at one side to lead 16', and at its other side through the blade 24 of relay 25 to the other side of the line at lead 16. With switch blade 19 closed as shown in FIG. 3, and armature 18 running at full speed, relay 25, which is a voltage sensitive relay, is normally open, and coil 23 de-energized. Thus with the mechanism running at full speed, and assuming that it is desired to stop and position the same, the switch 17 is thrown so that blade 19 opens, while a second blade 26 of the switch closes. This action disconnects the line from the armature 18 of the motor and connects a dynamic braking resistor 27 in circuit with armature 18, thereby effecting dynamic braking of the motor. The complete stopping of the motor is not desired, however, until detent 21 arrives opposite the plunger 20. To accomplish this, it will be noted that the resistor 27 forms part of a voltage divider comprising also a second resistor 29, across the line 16, 16'.

This voltage divider circuit has a switch 30 in circuit therewith across the line 16, 16', which switch is normally closed, but is adapted to be opened by plunger 20 when the latter enters detent 21. Thus, when blade 19 is opened by operation of switch 17, and switch 30 is closed, the motor is braked, but not to a full stop since the voltage across resistor 27 taken from the line is sufficient to drive motor armature 18 at a fraction of its original speed. Also, when voltage across the armature 18 drops due to the opening of switch blade 19 and the closing of blade 26, the voltage sensitive relay 25 operates to closed position under the action of the spring shown, thereby closing a circuit between leads 16, 16 for the coil 23 and hence actuating plunger 20 against the tension of spring 22 so that this plunger presses against frame 10, and enters notch 21 as soon as this notch arrives opposite the plunger, thereby stopping the frame 10, and the lenses 4, 4 at the desired index position.

As plunger 20 enters the detent 21, it opens the contacts of switch 30, which removes the voltage from the armature 18 and causes the motor 6 to stop. A similar control circuit is provided for coil 23' associated with plunger 20' employed for positioning or indexing the lenses 11, 11' which are shown in FIG. 4 as driven from a separate motor 13 through gearing 14, although a single motor as in FIG. 1 may be used with an appropriate slip clutch in gearing 14. Other means for indexing the pairs of lenses could be used such as mechanical means, but FIG. 3 shows a typical way of accomplishing this result.

If desired, the effects of the wedge 32 can be nullified during scanning operations of wedges 4, 4', 11, 11' completely, by the use of a suitable control voltage to be applied to the deflecting plates of the indicating cathode ray tube. This is shown in FIG. 4 by use of a selsyn transmitter 36 driven from frame 33 and acting to apply deflection plate control voltage to the cathode ray indicating tube 37, and hence indications of this tube are not distorted by the prism or wedge lens 32 during normal raster scan.

It will be noted that in FIG. 4, the electromagnetic energy is shown supplied from a wave guide 1', through a mouth 2' and spilled into a parabolic reflector 3', which is used in lieu of the lens 3 of FIG. 1. The whole system in FIG. 4 is shown universally mounted by means of trunnions 38, 39, and the same may be true of FIG. 1, in order that the scanning and tracking operations may be carried on regardless of the location of the target or object with respect to the scanner system circuit.

If desired, other means such as a lineal scanner can be used in lieu of one pair of wedges 4, 4' for example, in which case only one pair of wedges, such as 11, 11' would be used.

In other instances, the feed system 2', 3' may produce a beam narrow in azimuth and broad in elevation, and this radiation pattern may be swept in azimuth by a single pair of wedges 4, 4'.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. In a scanning antenna structure for locating objects comprising an antenna feed for emitting electromagnetic energy, a pair of oppositely rotatable similar dielectric wedge lenses positioned in the path of energy from said antenna feed, an electromagnetic deflector fixed with respect to said antenna feed for deflecting energy for passing through said wedge lenses, motive means connected for rotating the wedge lenses in opposite directions to effect a linear scanning operation in one direction, means for receiving the electromagnetic energy from said wedge lenses for effecting a linear scanning operation of said energy in a direction at right angles to said one direction to produce a resulting raster searching scan, and a rotatable single wedge lens also positioned in the path of energy from said feed for effecting a conical tracking scan operation for tracking purposes.

2. In a scanning antenna structure for locating objects, as defined in claim 1, wherein an indicator is provided for indicating the positions of objects located, and transmitter means connected with said single wedge lens and with said indicator for erasing said tracking scan during the operation of the raster searching scan.

3. In apparatus of the character described for locating by scanning and then tracking an object, means for supplying a beam of electromagnetic energy, means in the path of said beam for effecting scanning movement of said beam in one plane, a pair of oppositely rotatable wedge-like refractive members interposed in said beam for effecting scanning in a plane at right angles to said first plane, and a rotatable tracking wedge lens member also positioned in the path of said beam for effecting conical scan of the beam.

4. In an apparatus as defined in claim 3 wherein indexing means are provided for indexing said pair of wedge-like refractive members.

5. In a scanning and tracking apparatus comprising a universally mounted scanning system consisting of a plurality of pairs of cooperative wedge-like refractive lens members, an individual member of each pair being rotatable in the opposite direction with respect to the other member of each such pair, said pairs of wedge-like members serving to produce a raster search scan when a beam of electromagnetic energy is passed therethrough, a rotatable tracking wedge lens member, said last named lens member serving to track a target located by said pairs of cooperating wedge-like members, and means for passing a beam of electromagnetic energy through all of said wedge lens members.

6. A scanning and tracking apparatus defined in claim 5, wherein said pairs of cooperative wedge-like refractive members are provided with indexing means for nullifying the effect thereof during scan operations performed by said tracking wedge lens member, said indexing means comprising an indexing circuit controlling a locking plunger means for retaining said pairs of wedge-like members in such positions that they do not deflect the beam of electromagnetic energy.

7. In scanning and tracking apparatus as defined in claim 5 wherein indexing means is provided for cooperating with said pairs of wedge-like refractive members for properly positioning said members with respect to each other during scan and with respect to said tracking wedge lens member during tracking.

References Cited by the Examiner
UNITED STATES PATENTS

| 1,647,631 | 11/1927 | Ives | 88—1 X |
| 1,689,847 | 10/1928 | Zworykin | 178—7.6 |
| 2,023,217 | 12/1935 | Benford | 178—7.6 |
| 2,422,579 | 6/1947 | McClellan. | |
| 2,429,601 | 10/1947 | Biskeborn et al. | |

FOREIGN PATENTS

| 631,802 | 12/1927 | France. |

HERMAN KARL SAALBACH, Primary Examiner.

MELVIN H. FRIEDMAN, SIMON YAFFEE,
Examiners.